(12) United States Patent
Fischhold et al.

(10) Patent No.: US 11,673,357 B2
(45) Date of Patent: Jun. 13, 2023

(54) INJECTION-MOLDING METHOD

(71) Applicant: adidas AG, Herzogenaurach (DE)

(72) Inventors: Marco Fischhold, Herzogenaurach (DE); Eric Jeandin, Herzogenaurach (DE); Harald Geyer, Herzogenaurach (DE); Ulisse Tanzini, Herzogenaurach (DE); Goussev Stanislav, Herzogenaurach (DE); Andrew Leslie, Herzogenaurach (DE); Matthias Linz, Herzogenaurach (DE); Sergius Merker, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 16/526,907

(22) Filed: Jul. 30, 2019

(65) Prior Publication Data
US 2020/0039161 A1 Feb. 6, 2020

(30) Foreign Application Priority Data

Jul. 31, 2018 (DE) ..................... 10 2018 212 760.3

(51) Int. Cl.
*B29D 35/06* (2010.01)
*A43B 9/18* (2006.01)
(Continued)

(52) U.S. Cl.
CPC .............. *B29D 35/061* (2013.01); *A43B 1/04* (2013.01); *A43B 7/12* (2013.01); *A43B 9/18* (2013.01);
(Continued)

(58) Field of Classification Search
CPC .. B29D 35/061; B29D 35/142; B29D 35/148; B29D 35/081; B29D 35/0009;
(Continued)

(56) References Cited

U.S. PATENT DOCUMENTS 1,502,036 A * 7/1924 Heilhecker ............ A43B 21/06
36/14
2,651,118 A * 9/1953 Root ................... B29D 35/0063
36/14
(Continued)

FOREIGN PATENT DOCUMENTS

AU WO9932276 * 7/1999
DE 1685 363 11/1971
(Continued)

OTHER PUBLICATIONS

Office Action of German Patent and Trademark Office directed to related German Patent Application No. 102018212760.3, dated Mar. 4, 2019, with attached English-language translation; 7 pages.
(Continued)

*Primary Examiner* — Emmanuel S Luk
(74) *Attorney, Agent, or Firm* — Sterne, Kessler, Goldstein & Fox P.L.L.C.

(57) ABSTRACT

The invention concerns a method of producing an article of footwear comprising: providing an upper; providing a mold and opening the mold; inserting the upper into the open mold; closing the mold; and injecting a pressurized molten resin, wherein, after the injecting, there is a gap filled with the resin between a side wall of the mold and an outer surface of at least a first portion of the upper, wherein the gap is essentially zero at a contacting point, wherein the gap increases gradually from the contacting point in at least a first region of the mold.

6 Claims, 9 Drawing Sheets

(51) Int. Cl.
*A43B 23/02* (2006.01)
*A43B 1/04* (2022.01)
*A43B 7/12* (2006.01)
*B29D 35/10* (2010.01)
*B29D 35/00* (2010.01)

(52) U.S. Cl.
CPC ...... *A43B 23/0245* (2013.01); *B29D 35/0009* (2013.01); *B29D 35/10* (2013.01)

(58) Field of Classification Search
CPC .. B29D 35/0018; B29D 35/10; B29D 35/122; B29D 35/128; A43B 9/18; A43B 23/0245; A43B 13/04; A43D 86/00
See application file for complete search history.

(56) References Cited

U.S. PATENT DOCUMENTS

| | | | |
|---|---|---|---|
| 3,101,496 A | | 8/1963 | Bingham, Jr. et al. |
| 3,134,141 A | * | 5/1964 | Hardy ............... B29C 45/17 425/119 |
| 3,425,095 A | * | 2/1969 | Alexander ......... B29C 45/03 425/119 |
| 3,480,979 A | * | 12/1969 | Gammons ........ A43C 15/161 12/142 R |
| 3,677,679 A | * | 7/1972 | Christie ........... B29D 35/128 425/119 |
| 3,709,973 A | * | 1/1973 | Maltby ........... B29D 35/0027 264/244 |
| 3,718,726 A | * | 2/1973 | Taylor ............ B29D 35/009 264/219 |
| 3,806,974 A | * | 4/1974 | Di Paolo ......... A43B 13/223 12/142 RS |
| 3,840,310 A | * | 10/1974 | Klee ................ B29C 45/37 425/119 |
| 4,150,455 A | * | 4/1979 | Fukuoka .......... A43B 1/0027 12/142 RS |
| 4,245,406 A | * | 1/1981 | Landay ............. A43B 5/00 264/244 |
| 4,407,034 A | * | 10/1983 | Ralphs ............ B29D 35/082 12/142 RS |
| 4,674,204 A | * | 6/1987 | Sullivan .......... B29D 35/122 264/244 |
| 5,575,089 A | * | 11/1996 | Giese ............... A43B 13/12 36/28 |
| 5,785,909 A | * | 7/1998 | Chang ............ B29C 44/1233 264/46.5 |
| 6,360,453 B1 | * | 3/2002 | Ellis, III ............ A43B 5/00 36/114 |
| 7,081,221 B2 | | 7/2006 | Paratore et al. |
| 7,546,699 B2 | * | 6/2009 | Ellis, III ........... A43B 13/141 36/103 |
| 8,141,276 B2 | * | 3/2012 | Ellis ............... A43B 3/0005 36/103 |
| 8,291,618 B2 | * | 10/2012 | Ellis ................ A43B 7/24 36/103 |
| 9,421,726 B2 | * | 8/2016 | Scofield ........... B29D 35/126 |
| 10,076,886 B2 | * | 9/2018 | Scofield .......... A43B 23/0215 |
| 2005/0076536 A1 | | 4/2005 | Hatfield et al. |
| 2006/0248749 A1 | * | 11/2006 | Ellis .............. A43B 13/181 36/28 |
| 2007/0204482 A1 | * | 9/2007 | Gibson-Collinson ........ A43D 25/07 36/10 |
| 2009/0113757 A1 | * | 5/2009 | Banik ............. A43B 13/26 36/28 |
| 2010/0287788 A1 | | 11/2010 | Spanks et al. |
| 2013/0074371 A1 | * | 3/2013 | Borel .............. A43B 7/142 36/102 |
| 2016/0302517 A1 | * | 10/2016 | Jessiman ......... A43B 13/187 |
| 2018/0103725 A1 | | 4/2018 | Chen |
| 2018/0153252 A1 | | 6/2018 | Archer et al. |

FOREIGN PATENT DOCUMENTS

| | | | | |
|---|---|---|---|---|
| EP | 1398140 A1 | | 3/2004 | |
| GB | 833934 A | * | 5/1960 | ......... B29D 35/065 |
| WO | WO 93/08008 A1 | | 4/1993 | |
| WO | WO 99/32276 | | 7/1999 | |

OTHER PUBLICATIONS

Notification of the Second Office Action of Chinese Patent Office directed to related Chinese Patent Application No. 201910698973.X, dated Apr. 15, 2021, with attached English-language translation; 22 pages.

* cited by examiner

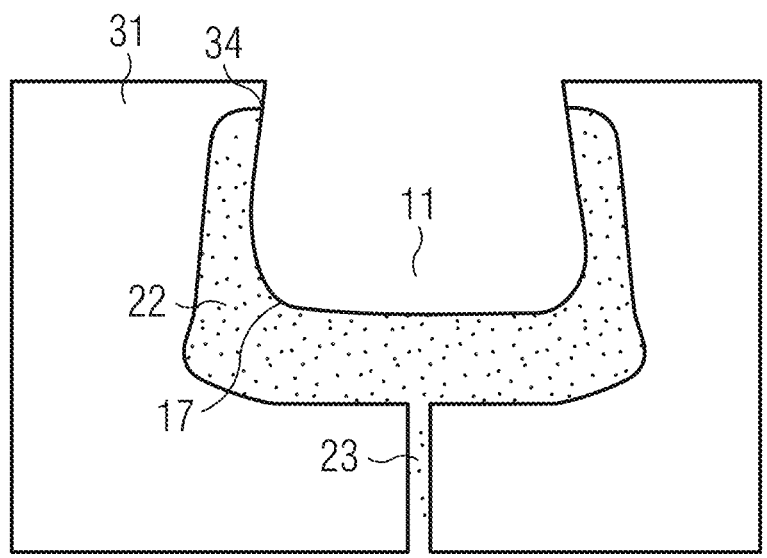
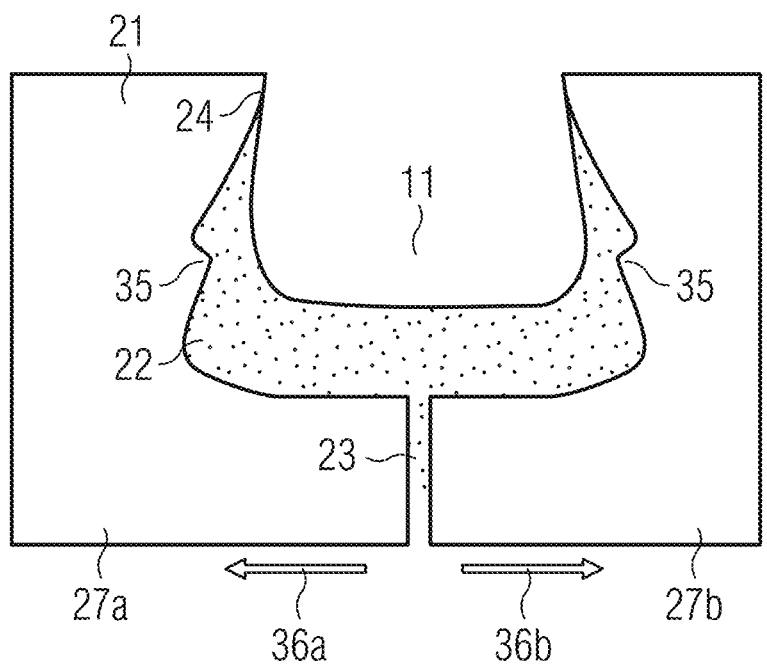

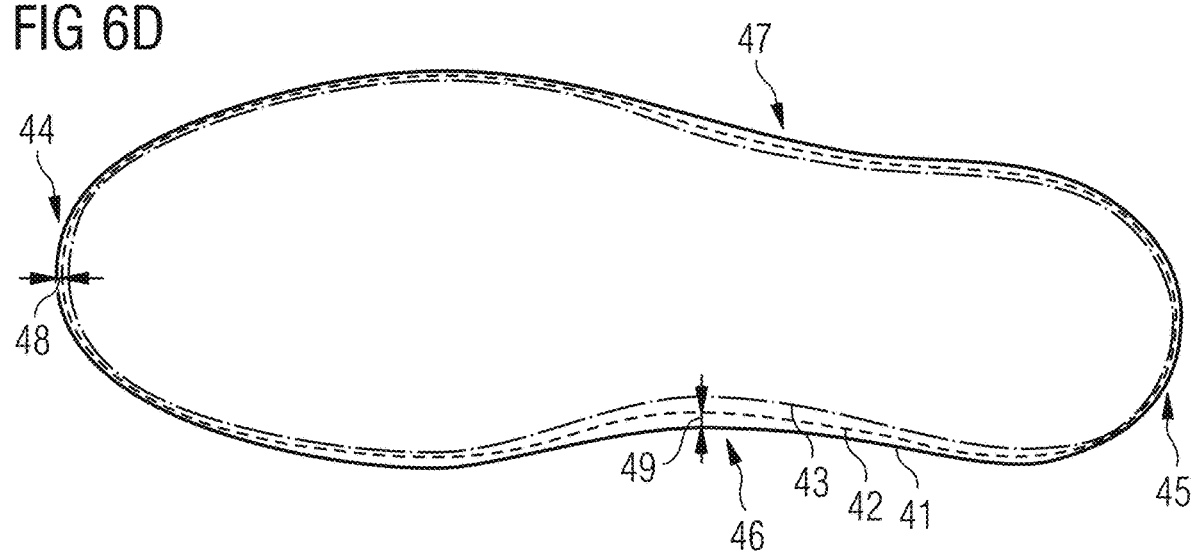
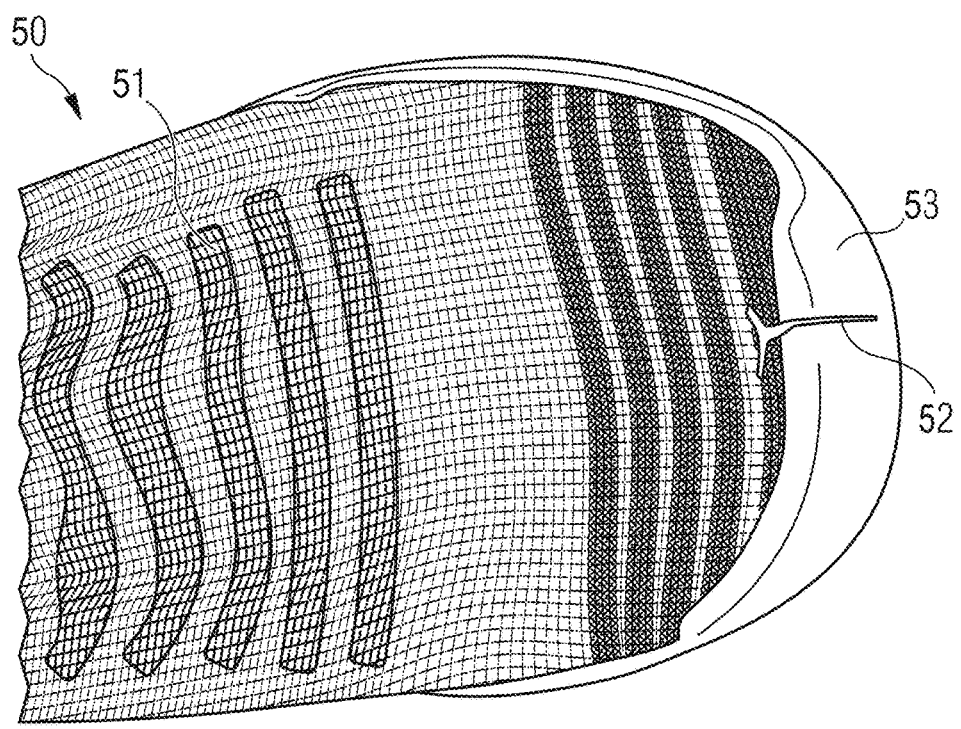

INJECTION-MOLDING METHOD

TECHNICAL FIELD

The present invention relates to an injection-molding method, a mold, and an article of footwear produced of these partly by injection molding.

PRIOR ART

Injection molding is frequently used in the production of footwear. Injection molding provides a useful and cost-effective way of providing elements for footwear, for example a sole for a shoe. It is particularly useful, that a sole can be directly injection-molded onto a shoe upper. Pressurized, molten resin is injected into a shoe mold, after placing an upper in the mold. In the methods known in the art however, the sharp closing edge of the mold causes a resulting sharp boundary of the solidified resin on the shoe upper. Shoes produced by methods known in the art therefore have a high weight and a bulky appearance and are primarily used for technical applications, such as safety shoes where weight and appearance are less of an issue.

Moreover, it is known that certain problems may occur during the molding process.

In an effect known as pinching, some resin is pinched, for example in the forefoot area, between separate parts of the mold during the molding process. The resulting pinching has an un-attractive visual appearance and presently needs to be removed manually.

Another common problem with direct injection molding is flashing. Flashing is an undesired spillover of the resin into areas of the upper where it is not desired. During injection molding, the resin may creep into parts of the upper unintentionally, giving the upper a defective and unclean look. This may also adversely affect the desired breathability of the upper.

EP 2815668 A1 concerns a method for manufacturing a shoe. The method includes the steps of: attaching a sock-shaped base member forming a portion of an upper to a last portion of a core, the core including a core print and the last portion; attaching the core to an outer mold; supplying a molten resin to be a reinforcement member and/or a sole member into between the outer mold and the base member; and allowing the molten resin to cure, thereby forming the reinforcement member and/or the sole member integral with the base member.

U.S. Pat. No. 4,245,406 A concerns a shoe and its method of manufacture in which an upper and preformed rubber outsole are joined by a foamed polyurethane, injection-molded midsole.

U.S. Pat. No. 5,647,150 A concerns a method of manufacturing footwear. The method includes the steps of positioning a sock portion over a mold element in which the sock portion comprises a fabric layer and a thermoplastic film layer connected to the fabric layer, such that the thermoplastic film layer is positioned between the mold element and the fabric layer, and injection-molding a thermoplastic material to the sock portion positioned over the mold element such that heated thermoplastic material flows through the fabric layer and bonds with the thermoplastic film layer and such that the thermoplastic material at least partially covers the fabric layer for forming a portion of an item of footwear.

U.S. Pat. No. 7,081,221 B2 concerns an article of textile-soled footwear and method of making, which employ a simple fabrication process and apparatus that allows fabrication of the footwear outer shell via a single injection-molding step. The article of footwear has a textile layer at the ground-contacting surface of the outsole, the textile layer being moldably and integrally attached, in a common mold, to the molded outsole as it is being created during the injection process.

An objective of the underlying the present invention is therefore to provide an improved method of injection molding, an improved mold, and an improved article of footwear that is of lower weight, and more visually appealing compared with the prior art.

SUMMARY OF THE INVENTION

This objective is accomplished by the teachings of the independent claims, in particular by a method of producing an article of footwear comprising: providing an upper; providing a mold and opening the mold; inserting the upper into the open mold; closing the mold; and injecting a pressurized molten resin, wherein, after the injecting, there is a gap filled with the resin between a side wall of the mold and an outer surface of at least a first portion of the upper, wherein the gap is essentially zero at a contacting point, wherein the gap increases gradually from the contacting point in at least a first region of the mold.

An article of footwear may be any type of shoe, for example a running shoe, a golf shoe, tennis shoe etc., or any type of boot, for example a football boot, a hiking boot, etc. or a sandal etc.

It is to be understood, that the upper may comprise a textile, for example, the upper may be knitted, woven, or non-woven. The upper may comprise a synthetic material, leather, natural fibres, etc. Therefore, they may not be a sharp interface between side wall of the mold and an outer surface of the upper. For example, if the upper is knitted, the upper may comprise channels formed by knitting. Hence, the term "essentially zero" is to be understood to be smaller than the variations in height of the material of the upper.

The resin may be for forming a sole element in addition to serving as a coating applied on the upper, for example to make the upper more waterproof or abrasion resistant. There may be no need to cut a molded sole element, therefore further reducing the waste.

Instead of a sharp boundary between an uncoated region of the upper and the resin, the resin gradually fades. Therefore, the weight of the article of footwear is reduced. Moreover, the inventors have found, that mechanical properties of the article of footwear are improved. The discontinuity between the coated and uncoated regions, as known in the art, leads to discontinuities in the stiffness of the article of footwear. This is not only experienced as uncomfortable, but also leads to a weak spot, at which the upper is likely to break over time. Therefore, the present method improves the durability of the upper. Moreover, the inventors have found, that this gradual fading may reduce or prevent unintended flashing. This also reduces the amount of waste due to lower rejection rates for finished articles of footwear. There may be no need to cut a molded sole element, therefore further reducing the waste.

The resin may comprise a thermoplastic polymer, for example thermoplastic polyurethane. Thermoplastic polymers are easy to use in an injection molding process and are advantageous as they may be welded together. Thermoplastic polyurethane in particular is advantageous as it also provides a good level of grip and allows intricate shapes to be formed, that cannot be formed with certain other materials.

The inventors have found that as the resin cools, its viscosity increases and the pressure decreases when getting closer to the contacting point. Therefore, the seal made by the mold at the contacting point does not need to be sufficiently strong to withstand the injection pressure, e.g. at an injection channel.

The gap may increase by less than 1 mm, preferably less than 0.75 mm, more preferably less than 0.5 mm, per mm of a distance from the contacting point in at least the first region of the mold, wherein the distance is measured along the outer surface of the upper. In other words, if the gap increases by less than 1 mm per mm of the distance, an average angle formed by the surface of the coating with the outer surface of the upper is less than 45°, i.e. less than arctan(1 mm/1 mm). The inventors have found that this range allows for an improved durability of the upper and may be especially effective in reducing or preventing unintended flashing and unnecessary waste due to lower rejection rates for finished articles of footwear.

It is to be understood that the distance is measured on the surface of the upper, i.e. below any resin coating, if present.

The distance may, for example, be a height determined from the contacting point towards a bottom region of the upper. A height is not necessarily along an axis defined by the direction of gravity but, instead, from the contacting point towards a bottom region of the upper. This may be advantageous, for example, if a sole element is integrally formed with a coating. In this case, the gap increases gradually towards the sole element, thus allowing for a particularly stable connection of the sole element, the coating, and the upper. Alternatively, the distance may be in any other orientation, for example from a toe region towards a heel region of the upper.

The side wall may contact the outer surface at a contacting point at an angle of less than 45 degrees, preferably less than 30 degrees, more preferably less than 37 degrees, most preferably less than 27 degrees. This angle may be considered an intersection angle in contrast with the average angle defined above. The advantages are similar to those described above, but the inventors have found that the angle at the contacting point is particularly important in view of preventing unintended flashing and improving the durability of the upper.

The first region of the mold may be arranged within 5 mm from below the contacting point. In other words, the average angle as defined above may relate to a region close to the contacting point. Therefore, unintended flashing may be prevented effectively, and the durability of the upper is improved.

The side wall of the mold may have a substantially convex shape. The side wall may have a texture in order to impart a texture on the resin. Therefore, the side wall may be "substantially convex", i.e. its general shape in a two-dimensional cross-section is convex, and its surface may comprise a modulation in the form of texture. The substantially convex shape is advantageous for creating a gradually-fading coating.

Closing the mold may cause at least a second portion of the upper to be compressed. In other words, at least one linear size of the mold may be smaller than the corresponding linear size of the upper. Therefore, a compression of the upper is effected even prior to the injection of the pressurized molten resin. The inventors have found, that this reduces the amount of unintended flashing or may avoid unintended flashing altogether.

The material of the upper may be compressed by a first compression distance in a first part of the upper and a second compression distance in a second part of the upper, wherein the first compression distance may be smaller than the second compression distance. For example, the upper may have a first thickness in the first part. The first compression distance is the difference between the uncompressed first thickness and the compressed first thickness, measured for example in mm. In other words, the pressure applied by the mold onto the upper may be non-uniform. The inventors have found, that this is an effective way of preventing unintended pinching. For example, the first compression distance may be 0.5 mm and the second compression distance may be 1 mm.

The inventors have found, that during injection molding, the pressure distribution inside the mold may be non-hydrostatic, that is the pressure is not uniform within the mold. This is especially true, further away from the injection point, where the resin has begun to cool down. Therefore, the different first and second compression distance also effect different pressures during the actual molding.

The first part of the upper may be arranged in a heel and/or a toe region and the second part of the upper may be arranged in a lateral and/or a medial region of the upper. In other words, the pressure applied by the mold onto the upper may be lower in a heel and/or a toe region than the pressure applied onto a lateral and/or medial region of the upper. Unintended flashing is often a problem in a heel and/or a toe region of the upper. The inventors have found, that a relatively lower pressure applied by the mold on a heel and/or a toe region of the upper allows unintended pinching to be prevented.

The mold may comprise at least a first part and a second part, wherein the first part and the second part are joined in a heel and a toe region. Geometrically, this arrangement is advantageous since it allows a great variety of shapes to be molded, for example so-called "undercuts". However, it may lead to the problem of unintended flashing in a heel and/or toe region of the upper if conventional molding techniques are applied. Therefore, the present invention is particularly advantageous in this configuration.

Injecting a pressurized molten resin may effect a further compression of at least a third portion of the upper. In other words, additional pressure may be applied onto the upper by injecting the pressurized molten resin. The inventors have found, that this allows a controllable penetration of the molten resin into the material of the upper.

The pressurized molten resin may, for example, be injected at a pressure of between 5 and 15 bar, preferably between 8 and 12 bar, for example about 10 bar. These pressures allow a uniform distribution of the resin in the mold.

The further compression of the third portion of the upper may cause the gap to open between an outer surface of the upper and the side wall of the mold. In other words, there may be no gap prior to the injection of the pressurized molten resin. Therefore, a particularly deep penetration of the pressurized molten resin into the material of the upper may be achieved, which may allow a preferred stiffness, durability, and level of waterproofness to be achieved. For example, a portion of the gap may be 0.4 mm thick.

The upper may be arranged on a shoe last, prior to inserting the upper into the open mold. This advantageously allows the shape of the upper to be conformed to the final design stage already during the injection molding. Therefore, an additional step, in which the upper is shaped is not required and the total number of production steps is reduced.

Furthermore, the last may act to stabilize the upper against a pressure applied by the mold and/or the pressurized molten resin.

The mold may further comprise at least a first injection channel for injecting the pressurized molten resin, wherein the injection channel may be arranged in a heel region of the mold. The inventors have found, that the pressurized molten resin may cool as it is being injected, therefore increasing its viscosity. This arrangement allows a particularly uniform distribution of the pressurized molten resin.

The injection channel may be arranged underneath the upper, e.g. in a heel region. The inventors have found, that the pressurized molten resin may cool as it is being injected, therefore increasing its viscosity. This arrangement allows a particularly uniform distribution of the pressurized molten resin.

The mold may further comprise at least a second injection channel. The mold may comprise any number of injection channels. By providing more than one injection channel, the pressurized molten resin may be distributed more uniformly.

The upper may be warp- or weft-knitted. A warp- or weft-knitted upper is particularly stretchable and therefore comfortable to wear, especially for sports shoes. Warp- and weft-knitting is generally referred to as knitting herein. Moreover, channels may be formed in a warp- or weft-knitted upper allowing the flow of the pressurized molten resin to be controlled. The relatively open fabric of a knitted upper also allows a deep penetration of the pressurized molten resin into the knit, therefore allowing a close and durable integration of the knit and the resin. Since knitted uppers may be quite fragile, the present invention allows the durability and wear resistance of a knitted upper to be improved significantly. However, generally the upper may be produced by any suitable method, for example the upper may be woven or non-woven.

A wale direction may be arranged substantially perpendicular to a longitudinal direction of the upper in a least a fourth portion of the upper. "Substantially perpendicular" in the present context means at an angle of between 60° and 120°, preferably 70° and 110°. A "wale direction" is understood as a direction along a wale. A "longitudinal direction" is understood as extending from a toe region to a heel region of an upper. A channel may be formed between adjacent wales. Therefore, the pressurized molten resin may flow in a controllable manner within the channels during the injection molding, allowing a desired amount of coating, i.e. preventing unintended flashing.

In some examples, a course direction may be arranged substantially perpendicular to a longitudinal direction of the upper in a least a fifth portion of the upper. A "course direction" is understood as a direction along a course. A channel may be formed between adjacent wales, arranged substantially perpendicular to the course direction. Therefore, the pressurized molten resin cannot flow easily into the channel during the injection molding, since the walls on the edges of the channel may prevent flow into the channel, reducing the amount of unintended flashing further.

It is therefore possible to create a fourth portion with a deliberate and controlled amount of coating without any indeliberate flashing, and a fifth portion with little or no flashing.

The method may further comprise at least partially filling at least one knit-opening in the warp- or weft-knitted upper with the resin. A knit-opening may, for example, be a channel, a partial hole, a partial aperture, a slit, etc. in the knitted structure of a warp- or weft knitted upper. A partial hole or aperture is knitted by holding some needles during knitting, while others continue to knit. In other words, partial holes or apertures in knitting can be created by holding certain knitted loops on to the needles, creating tuck stitches. This may advantageously add support or abrasion resistance to at least one area of the upper. For example, the area may be a heel region, a lateral region, and/or a medial region of the upper, where additional support may be required.

The resin may adapt to the knitted structure. For example, a thickness of the resin coating may be sufficiently thin for the knitted structure to remain visible through the resin coating. This way, the structural properties imposed by the knitted structure are largely unperturbed by the coating, but the coating may nonetheless provide abrasion resistance and waterproofing.

The resin may form a sole element of the article of footwear. Therefore, it is possible to coat the upper and produce a sole element in a single injection molding step. Therefore, the number of production steps is reduced. In other words, there may be a "seamless" transition between the sole and the upper.

The sole element may be essentially the entire sole of the article of footwear. In other words, it may not be necessary to attach additional elements, such as an additional outsole, to the sole element. Therefore, the production is simplified.

The sole element may be a midsole of the article of footwear. The method according to the present invention allows the pressurized molten resin to produce a foamed midsole, therefore allowing preferable cushioning. Since the bending stiffness against lateral bending increases strongly with the thickness of the material, such a midsole may also provide a good level of stiffness at a low weight. The midsole may be essentially the entire sole of the article of footwear or, alternatively, an additional outsole may be attached in a further step. For example, an additional outsole may be attached by means of an adhesive, or by welding, such as high-frequency welding or infrared welding. Preferably, the additional outsole comprises a same material, for example thermoplastic polyurethane, as the midsole, in order to effect a strong bond between the midsole and the outsole.

The invention further concerns a mold for producing an article of footwear comprising: a side wall forming a cavity for receiving a shoe upper, wherein the side wall is configured to contact the upper at a contacting point and wherein, after injecting a pressurized molten resin into the mold, there is a gap filled with the resin between a side wall of the mold and an outer surface of the upper, wherein the gap is essentially zero at a contacting point, wherein the gap increases gradually from the contacting point, in at least a first region of the mold; and at least a first injection channel for injecting a pressurized molten resin.

A side wall forming a cavity for receiving a shoe upper is to be understood that the side wall at least partially defines the shape of a cavity for receiving a shoe upper. The shape of the cavity may further be defined by other elements, for example a shoe last on which the upper is arranged may also define part of the shape of the cavity. The cavity may be considered to be part of the mold.

Instead of a sharp boundary between an uncoated region of the upper and the resin, the resin gradually fades. The advantages thereof have been described herein.

The gap may increase by less than 1 mm, preferably less than 0.75 mm, more preferably less than 0.5 mm, per mm of a distance from the contacting point in at least the first region of the mold, wherein the distance is measured along the outer surface of the upper. In other words, if the gap increases by less than 1 mm per mm of the distance, an average angle formed by the surface of the coating with the outer surface of the upper is less than 45°, i.e. less than arctan(1 mm/1 mm). The inventors have found that this range allows for an improved durability of the upper and may be especially effective in reducing or preventing unintended flashing and unnecessary waste due to lower rejection rates for finished articles of footwear. It is to be understood that the distance is measured on the surface of the upper, i.e. below any resin coating, if present.

The distance may, for example, be a height determined from the contacting point towards a bottom region of the upper. A height is not necessarily along an axis defined by the direction of gravity but, instead, from the contacting point towards a bottom region of the upper. This may be advantageous, for example, if a sole element is integrally formed with a coating. In this case, the gap increases gradually towards the sole element, thus allowing for a particularly stable connection of the sole element, the coating, and the upper. Alternatively, the distance may be in any other orientation, for example from a toe region towards a heel region of the upper.

The first region of the mold may be arranged at least 2 cm above a floor of the cavity. Above a floor of the cavity is to be understood with respect to the orientation of the shoe upper, and not necessarily the axis defined by the direction of gravity. Therefore, the resin may form a sole element that does not need to have the gradually-sloping shape of the coating, in a region of 2 cm above the floor of the cavity, and a gradually-fading coating as described above. Thus, a sole element and the coating may be formed in a single process step.

The side wall of the mold may have a substantially convex shape. The side wall may have a texture in order to impart a texture on the resin. Therefore, the side wall may be "substantially convex", i.e. its general shape in a two-dimensional cross-section is convex, and its surface may comprise a modulation in the form of texture. The substantially convex shape is advantageous for creating a gradually-fading coating.

The mold may comprise at least a first part and a second part and the first part and the second part may be joined in a heel and a toe region. Geometrically, this arrangement is advantageous since it allows a great variety of shapes to be molded, for example so-called "undercuts". However, it may lead to the problem of unintended flashing in a heel and/or toe region of the upper if conventional molding techniques are applied. Therefore, the present invention is particularly advantageous in this configuration.

The injection channel may be arranged in a heel region of the mold. The inventors have found, that the pressurized molten resin may cool as it is being injected, therefore increasing its viscosity. This arrangement allows a particularly uniform distribution of the pressurized molten resin.

The injection channel may be arranged underneath the upper, e.g. in a heel region. The inventors have found, that the pressurized molten resin may cool as it is being injected, therefore increasing its viscosity. This arrangement allows a particularly uniform distribution of the pressurized molten resin.

The mold may further comprise at least a second injection channel. The mold may comprise any number of injection channels. By providing more than one injection channel, the pressurized molten resin may be distributed more uniformly.

The invention further concerns an article of footwear, comprising: an upper; an injection-molded region comprising a resin, wherein the resin at least partly coats an outer surface of the upper, wherein the resin coating ceases at a first position, and wherein a thickness of the resin coating increases gradually, in at least a first region of the upper.

Instead of a sharp boundary between an uncoated region of the upper and the resin, the resin gradually fades. The advantages thereof have already been described elsewhere herein.

The thickness of the resin coating may increase by less than 1 mm, preferably less than 0.75 mm, more preferably less than 0.5 mm, per mm of a distance from the first position in at least the first region of the upper, wherein the distance is measured along the outer surface of the upper. In other words, if the thickness of the resin coating increases by less than 1 mm per mm of the distance, an average angle formed by the surface of the coating with the outer surface of the upper is less than 45°, i.e. less than arctan(1 mm/1 mm). It should be noted that the first position may correspond to the contacting point described herein. The inventors have found that this range allows for an improved durability of the upper and may be especially effective in reducing or preventing unintended flashing and unnecessary waste due to lower rejection rates for finished articles of footwear. It is to be understood that the distance is measured on the surface of the upper, i.e. below any resin coating, if present.

The distance may, for example, be a height determined from the first position towards a bottom region of the upper. A height is not necessarily along an axis defined by the direction of gravity but, instead, from the first position towards a bottom region of the upper. This may be advantageous, for example, if a sole element is integrally formed with a coating. In this case, the gap increases gradually towards the sole element, thus allowing for a particularly stable connection of the sole element, the coating, and the upper. Alternatively, the distance may be in any other orientation, for example from a toe region towards a heel region of the upper.

The outer surface of the resin coating may form an angle of less than 45 degrees with an outer surface of the upper at the first position. This angle may be considered an intersection angle in contrast with the average angle defined above. The advantages are similar to those described above, but the inventors have found that the angle at the first position is particularly important in view of preventing unintended flashing and improving the durability of the upper.

The first region of the upper may be arranged less than 5 mm below the first position. In other words, the average angle as defined above may relate to a region close to the first position. Therefore, unintended flashing may be prevented effectively and the durability of the upper is improved.

The upper may be warp- or weft-knitted. The advantages of a knitted upper have already been described herein.

A wale direction may be arranged substantially perpendicular to a longitudinal direction of the upper in a least a fourth portion of the upper. The advantages thereof have been described herein.

In some examples, a course direction may be arranged substantially perpendicular to a longitudinal direction of the upper in a least a fifth portion of the upper. The advantages thereof have been described herein.

The resin may form a sole element of the article of footwear. Therefore, it is possible to coat the upper and produce a sole element in a single injection molding step. Therefore, the number of production steps is reduced.

At least one knit-opening in the warp- or weft-knitted upper may be at least partially filled with the resin. A knit-opening may, for example, be a channel, a partial hole, a slit, etc. in the knitted structure of a warp- or weft knitted upper. This may advantageously add support or abrasion resistance to at least one area of the upper. For example, the area may be a heel region, a lateral region, and/or a medial region of the upper, where additional support may be required.

The resin may adapt to the knitted structure. For example, a thickness of the resin coating may be sufficiently thin for the knitted structure to remain visible through the resin coating. This way, the structural properties imposed by the knitted structure are largely unperturbed by the coating, but the coating may nonetheless provide abrasion resistance and waterproofing.

The sole element may be essentially the entire sole of the article of footwear. In other words, it may not be necessary to attach additional elements, such as an additional outsole, to the sole element. Therefore, the production is simplified.

The sole element may be a midsole of the article of footwear. The advantages thereof have already been described herein.

The injection-molded region may be devoid of any pinching. Pinching is an unintended effect that leads to a worse visual appearance. The article of footwear according to the present invention is therefore preferably devoid of any pinching.

An edge of the coating may be essentially flush with the outer surface of the upper. "Essentially flush" means, in this context, within a range of fluctuations in height of the outer surface of the upper, which is may be less than 5 mm, preferably less than 2 mm, most preferably less than 1 mm. In other words, "essentially flush" means a "smooth" or "even" transition of the resin into the upper with essentially no hard edges. This way, the transition between the uncoated and coated regions of the upper is particularly smooth. As explained herein, this is advantageous as it improves the durability of the upper and reduces or prevents unintended flashing.

It is to be understood that the first, second, third, fourth, fifth portion of the upper may pairwise overlap at least partially, or entirely, or not at all.

SHORT DESCRIPTION OF THE FIGURES

In the following, exemplary embodiments of the invention are described with reference to the figures.

FIG. 1 shows an exemplary article of footwear according to the present invention;

FIGS. 2A-E shows an exemplary article of footwear according to the present invention;

Figure 7B:
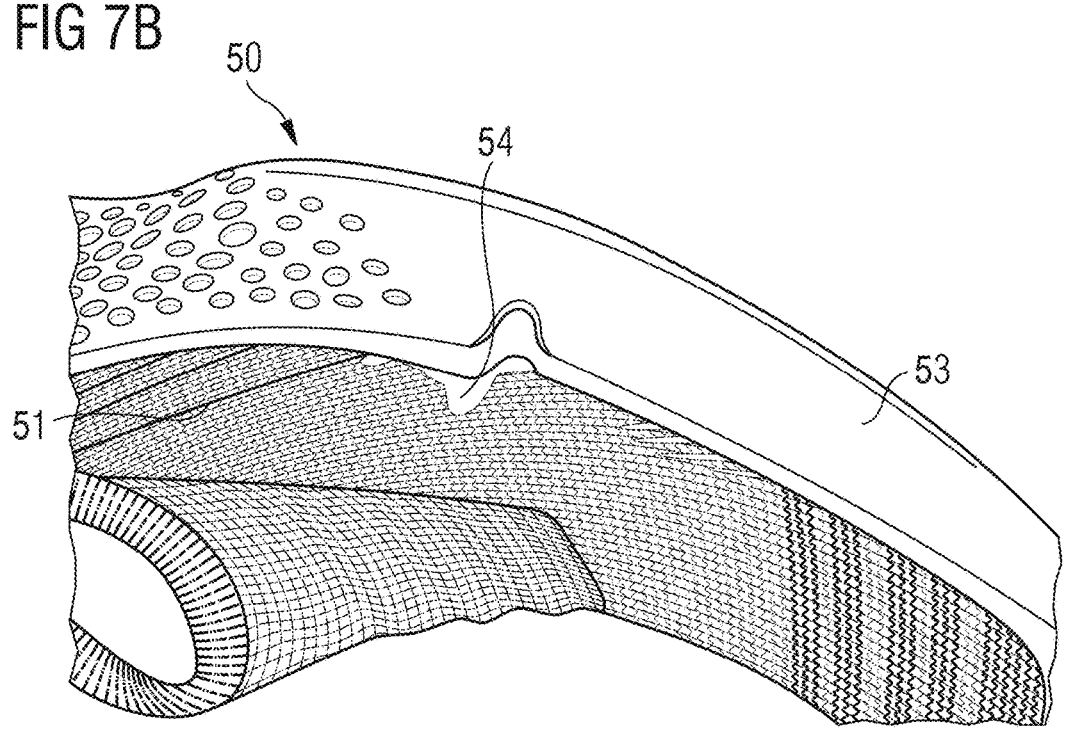
Figure 8:
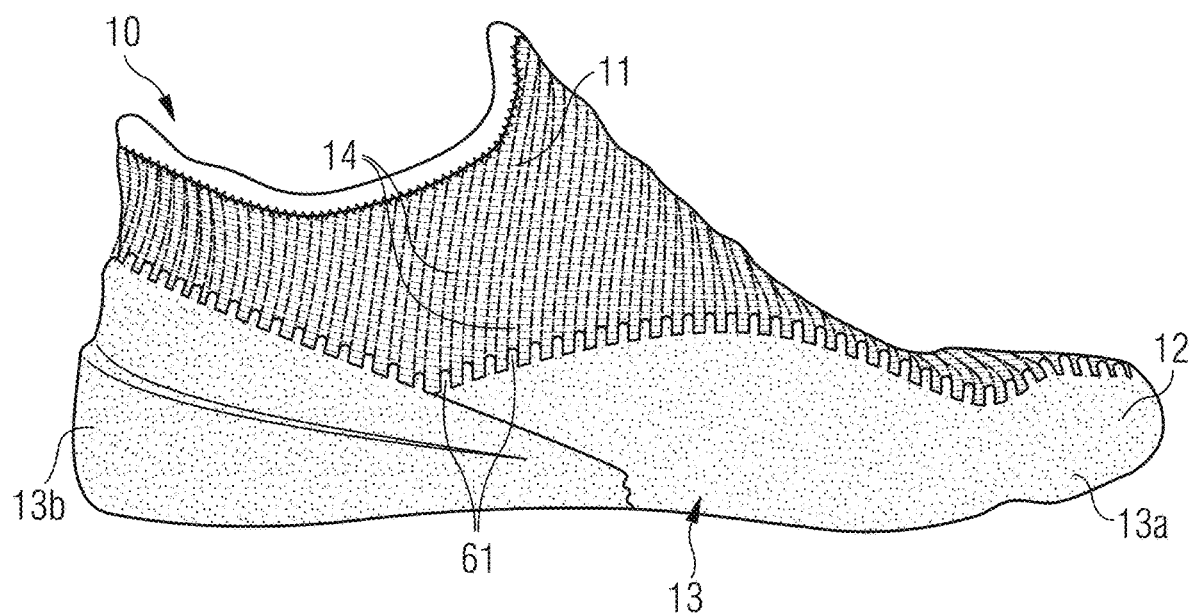
Figure 9:
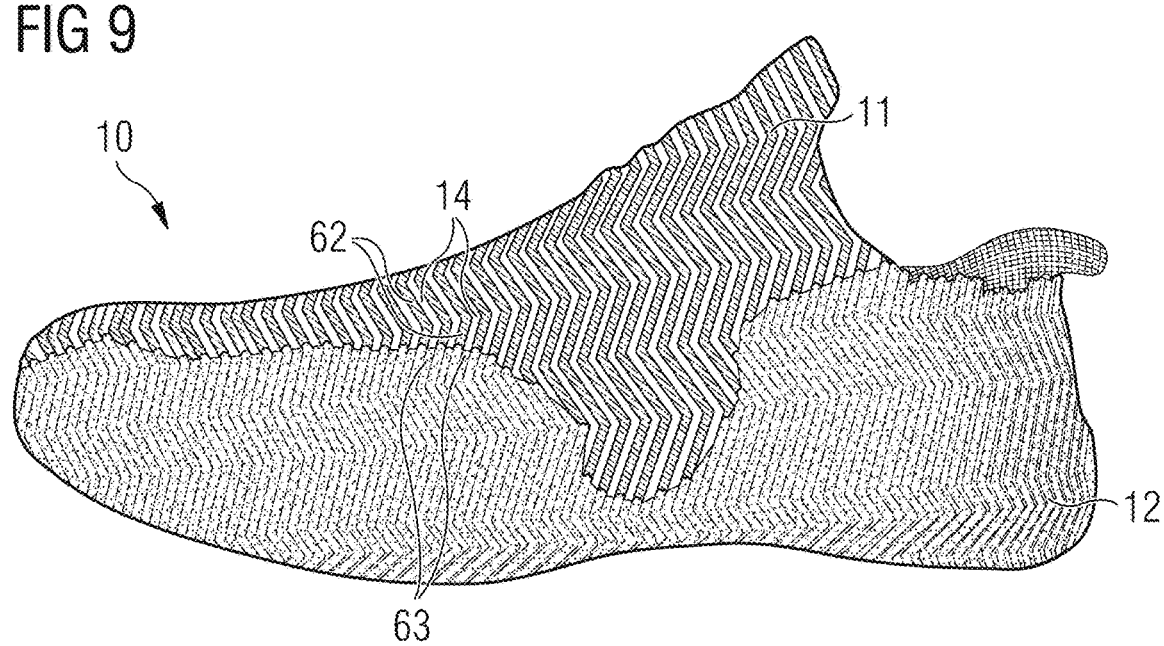
Figure 10:
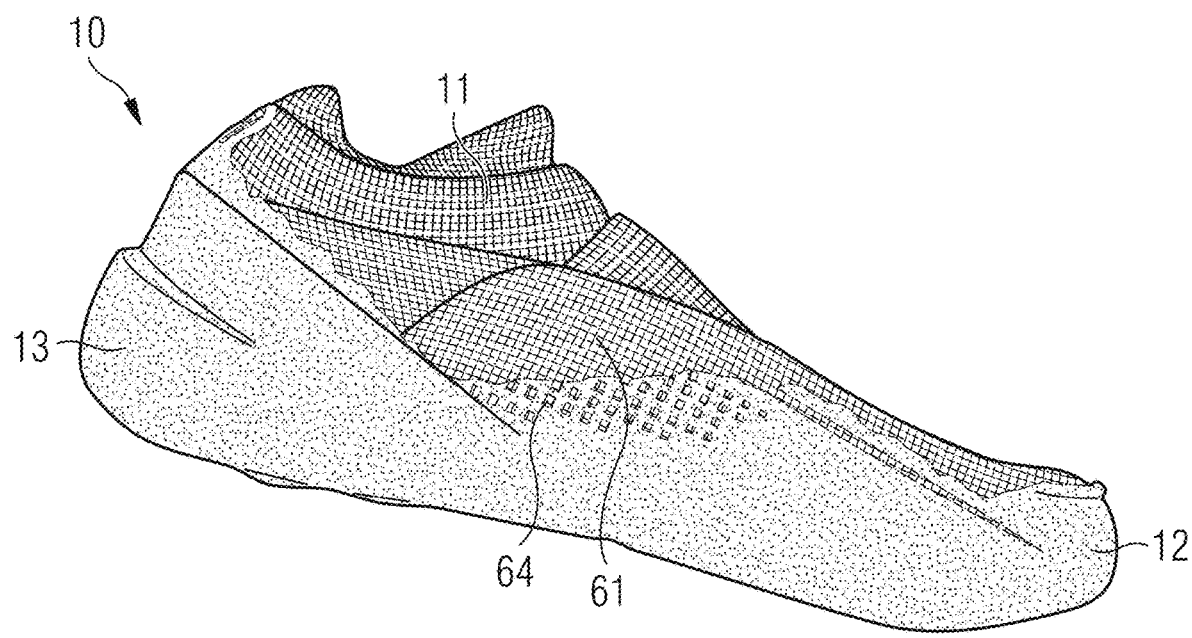
Figure 11:
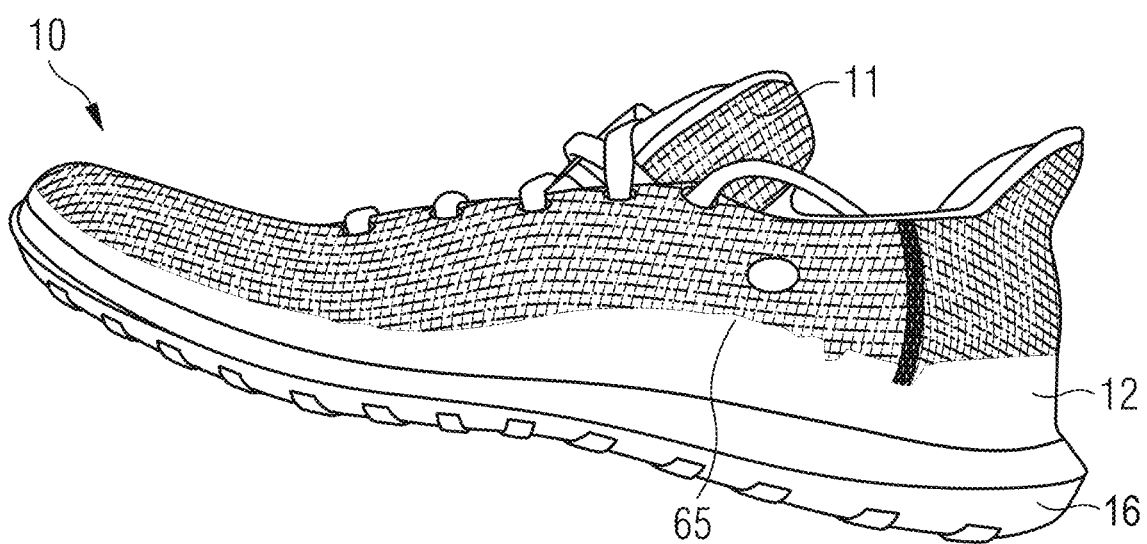

FIGS. 6A-D show exemplary molds and illustrate methods for operation thereof;

FIGS. 7A-B illustrate pinching and flashing in a conventional shoe;

FIG. 8 shows another exemplary article of footwear according to the present invention;

FIG. 9 shows another exemplary article of footwear according to the present invention;

FIG. 10 shows another exemplary article of footwear according to the present invention; and FIG. 11 shows another exemplary article of footwear according to the present invention.

DETAILED DESCRIPTION OF PREFERRED EMBODIMENTS

In the following some embodiments of the invention are described in detail. It is to be understood that these exemplary embodiments can be modified in a number of ways and combined with each other whenever compatible and that certain features may be omitted in so far as they appear dispensable.

Figure 1:
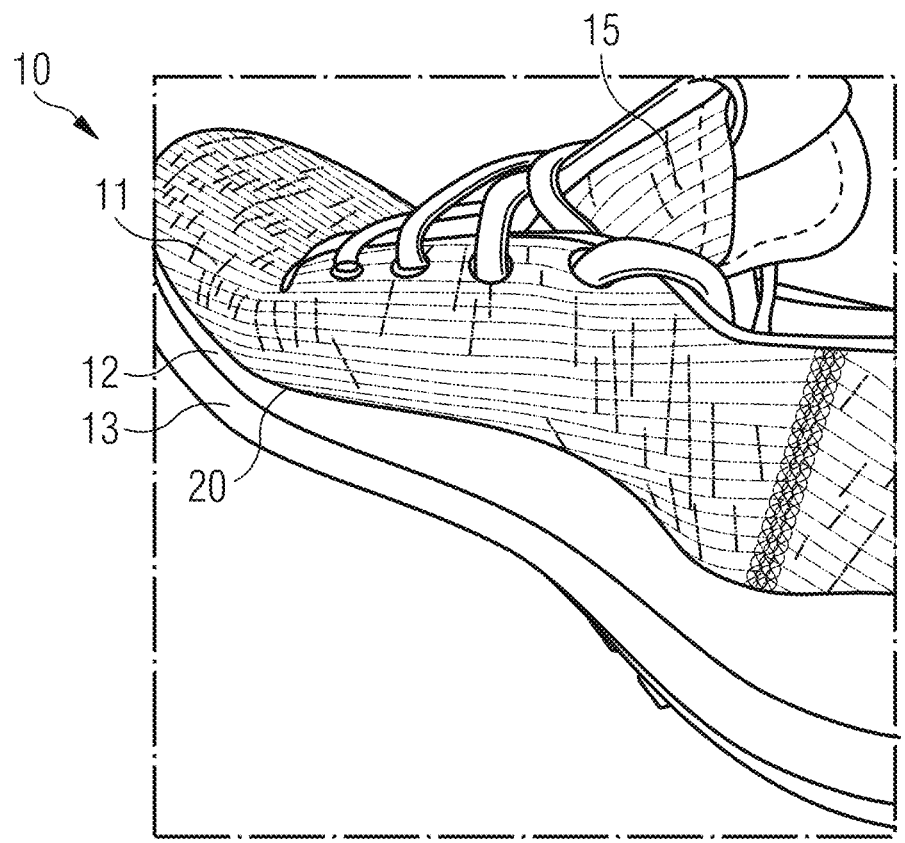

FIG. 1 shows an exemplary article of footwear 10 according to the present invention. The article of footwear 10 comprises: an upper 11; an injection-molded region comprising a resin, wherein the resin at least partly coats an outer surface of the upper 11, wherein the resin coating 12 ceases at a first position, and wherein a thickness of the resin coating 12 increases gradually in at least a first region of the upper 11. The resin is for forming a sole element 13 and additionally acts as a coating 12 applied on the upper 11. The article of footwear 10 further comprises a tongue 15 and shoe laces. In this example the article of footwear 10 is a running shoe.

The thickness of the resin coating 12 increases by less than 1 mm per mm of a distance from the first position 20 in at least the first region 19 of the upper 11, wherein the distance is measured along the outer surface 17 of the upper 11. The distance is a height determined from the first position 20 towards a bottom region of the upper 11.

In this example, the upper 11 is weft-knitted. The upper 11 shown in FIG. 1 may be produced by any method disclosed herein using a mold 21 as disclosed herein.

Figure 2A:
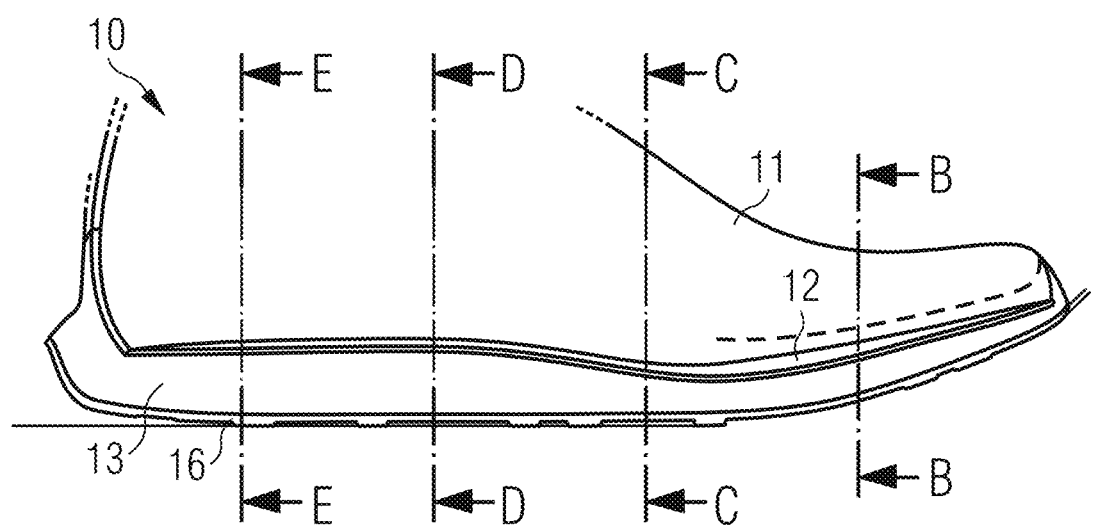

FIGS. 2A-E show a schematic of an article of footwear 10 according to the present invention. FIG. 2A shows a lateral view, while FIGS. 2B-E show a cross-sectional view through the sections indicated with E-E, D-D, C-C, and B-B, respectively, in FIG. 2A.

The article of footwear 10 comprises: an upper 11; an injection-molded region comprising a resin, wherein the resin at least partly coats an outer surface 17 of the upper 11, wherein the resin coating 12 ceases at a first position, and wherein a thickness of the resin coating 12 increases gradually along a height, in at least a first region 19 of the upper 11, wherein the height is measured from the first position 20 towards a bottom region of the upper 11 along the outer surface 17 of the upper 11. The height is measured on the surface 17 of the upper 11, i.e. below any resin coating 12, if present.

The resin forms a sole element 13 of the article of footwear 10. The injection-molded region, which comprises the coating 12 and the sole element 13 is devoid of any pinching. The sole element 13 is a midsole of the article of footwear 10 and an additional outsole 16 is attached by infrared welding.

Figure 2B:
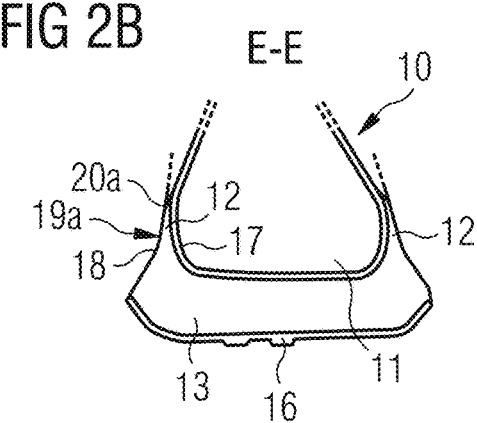

A first exemplary first region 19a is shown in the cross-sectional cut from E-E shown in FIG. 2B. The thickness of the resin coating 12 increases approximately symmetrically on both sides by about 0.6 mm per mm of height, an average angle formed by the surface 18 of the coating 12 with the outer surface 17 of the upper 11 is therefore about 31°, i.e. the arctan(0.6 mm/1 mm).

The outer surface 18 of the resin coating 12 forms an angle of about 35° with an outer surface 17 of the upper 11 at a first exemplary first position 20a.

Figure 2C:
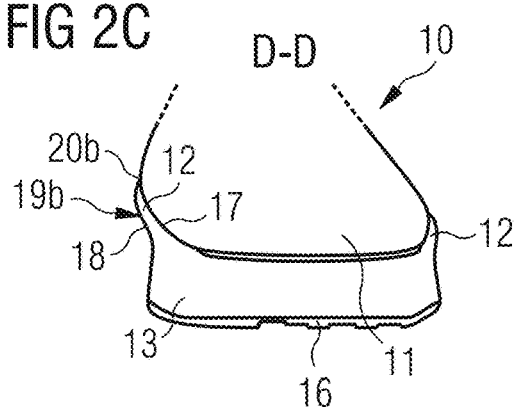

A second exemplary first region 19b is shown in the cross-sectional cut from D-D shown in FIG. 2C. The thickness of the resin coating 12 increases approximately symmetrically on both sides by about 0.4 mm per mm of height, an average angle formed by the surface 18 of the coating 12 with the outer surface 17 of the upper 11 is therefore about 22°, i.e. the arctan(0.4 mm/1 mm). However, in this cut, the coating 12 extends significantly higher on a left side than on a right side of the exemplary upper 11.

The outer surface 18 of the resin coating 12 forms an angle of about 30° with an outer surface 17 of the upper 11 at a second exemplary first position 20b.

Figure 2D:
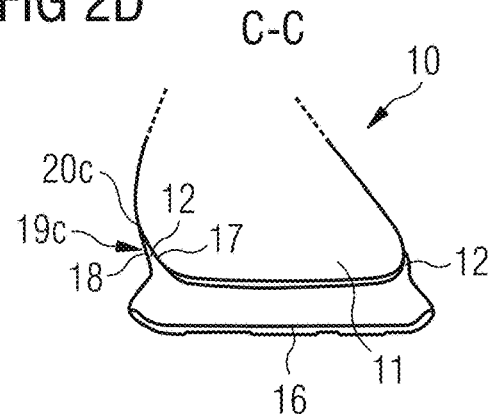

A third exemplary first region 19c is shown in the cross-sectional cut from C-C shown in FIG. 2D. The thickness of the resin coating 12 increases on a left side by about 0.9 mm per mm of height and on a right side by about 0.6 mm per mm of height, an average angle formed by the surface 18 of the coating 12 with the outer surface 17 of the upper 11 is therefore about 42° on a left side, i.e. the arctan(0.9 mm/1 mm) and about 31° on a right side. In this cut, the coating 12 extends to approximately the same level on a left side as on a right side of the exemplary upper 11.

The outer surface 18 of the resin coating 12 forms an angle of about 50°, i.e. more than 45°, with an outer surface 17 of the upper 11 at a third exemplary first position 20c on a left side and about 40° in a right side.

In the exemplary cuts shown in FIGS. 2B-D, the first region 19a-c of the upper 11 extends to 10 mm below the first position.

A fourth exemplary first region 19d is shown in the cross-sectional cut from D-D shown in FIG. 2C. The thickness of the resin coating 12 increases approximately symmetrically on both sides by about 0.35 mm per mm of height, an average angle formed by the surface 18 of the coating 12 with the outer surface 17 of the upper 11 is therefore about 19°, i.e. the arctan(0.35 mm/1 mm). However, in this cut, the coating 12 extends significantly higher on a left side than on a right side of the exemplary upper 11.

The outer surface 18 of the resin coating 12 forms an angle of about 19° with an outer surface 17 of the upper 11 at a fourth exemplary first position 20d.

A smaller angle may be preferred to generate a unique look mimicking a fused single-piece shoe where the upper and midsole are indistinctive. In combination with the upper this effect can be enhanced as the upper could have a specific topography allowing the PU to flash up in some parts (thinner upper) or restrict the PU flow in other parts. The unique look could then be reinforced with different upper types or/and zonings of a customized knit structure.

Figure 2E:
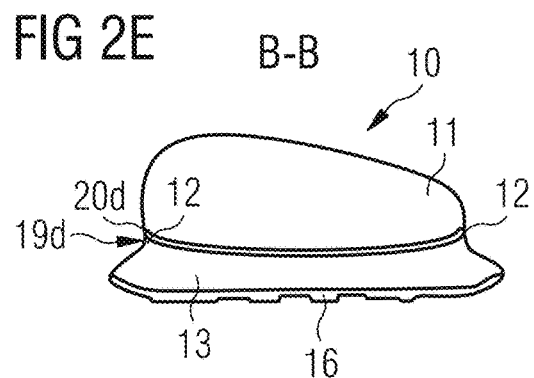

In the exemplary cut shown in FIG. 2E, the first region 19d of the upper 11 extends from the fourth exemplary first position 20d to 4 mm below the first position.

The upper 11 shown in FIGS. 2A-E may be produced by any method disclosed herein using a mold 21 as disclosed herein.

Figure 3:
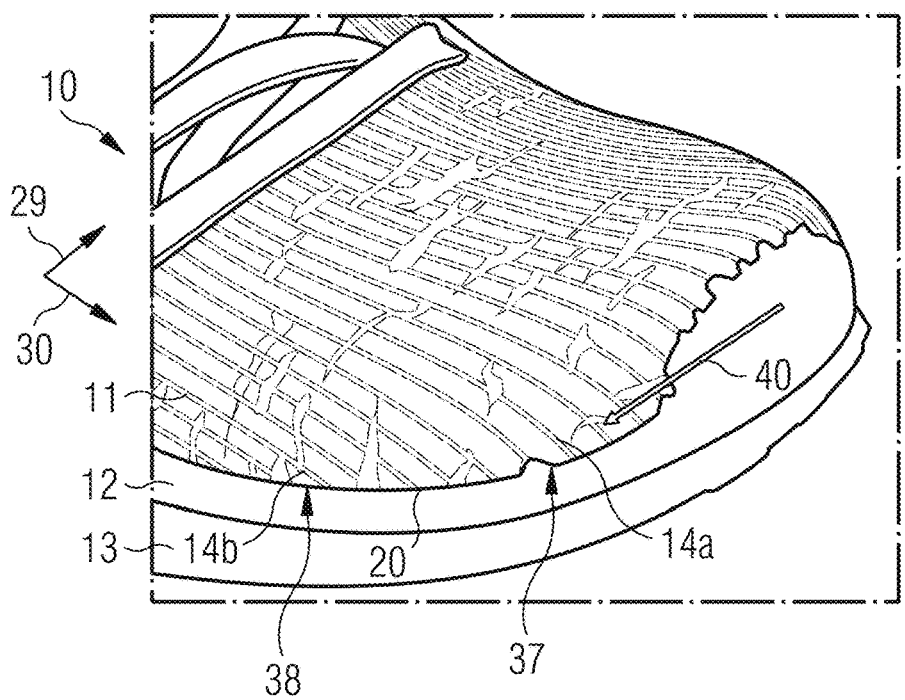
FIG. 3 shows another exemplary article of footwear according to the present invention.

FIG. 3 shows another exemplary article of footwear 10 according to the present invention. The article of footwear 10 comprises an upper 11; an injection-molded region comprising a resin, wherein the resin at least partly coats an outer surface of the upper 11, wherein the resin coating 12 ceases at a first position 20, and wherein a thickness of the resin coating 12 increases gradually, in at least a first region of the upper 11. The resin is for forming a sole element 13 and additionally acts as a coating 12 applied on the upper 11.

In this example, a thickness of the resin coating 12 increases gradually also along a lateral direction 40 at least in a toe region of the upper. In addition, a thickness of the resin coating 12 increases gradually along a height in the toe region of the upper and a lateral region of the shoe upper, beginning just behind the toe region.

As can be seen from FIG. 3, the injection-molded region, comprising the resin coating 12 and the sole element 13 is devoid of any pinching.

The exemplary upper 11 is weft knitted. In this example, a wale direction 30 is arranged substantially perpendicular to a longitudinal direction of the upper 11 in a least a fourth portion 37 of the upper 11. A channel 14a is formed between adjacent wales in the fourth portion 37. Therefore, the pressurized molten resin may flow in a controllable manner in the fourth portion 37 within the channel 14a during the injection molding, allowing a desired amount of flashing further, i.e. preventing unintended flashing.

Additionally, a course direction 29 is arranged substantially perpendicular to a longitudinal direction of the upper 11 in a least a fifth portion 38 of the upper 11. A channel 14b is formed between adjacent wales, arranged substantially perpendicular to the course direction, in the fifth portion 38. Therefore, the pressurized molten resin cannot flow easily into the channel 14b during the injection molding, since the walls on the edges of the channel 14b may prevent flow into the channel, reducing the amount of unintended flashing further.

It is therefore possible to create a fourth portion 37 with deliberate, controlled amount of coating but not indeliberate flashing and a fifth portion 38 with little or no flashing. In this example, the fourth portion is located in a toe region while the fifth portion is located in a lateral region of the shoe upper, beginning just behind the toe region.

Figure 4:
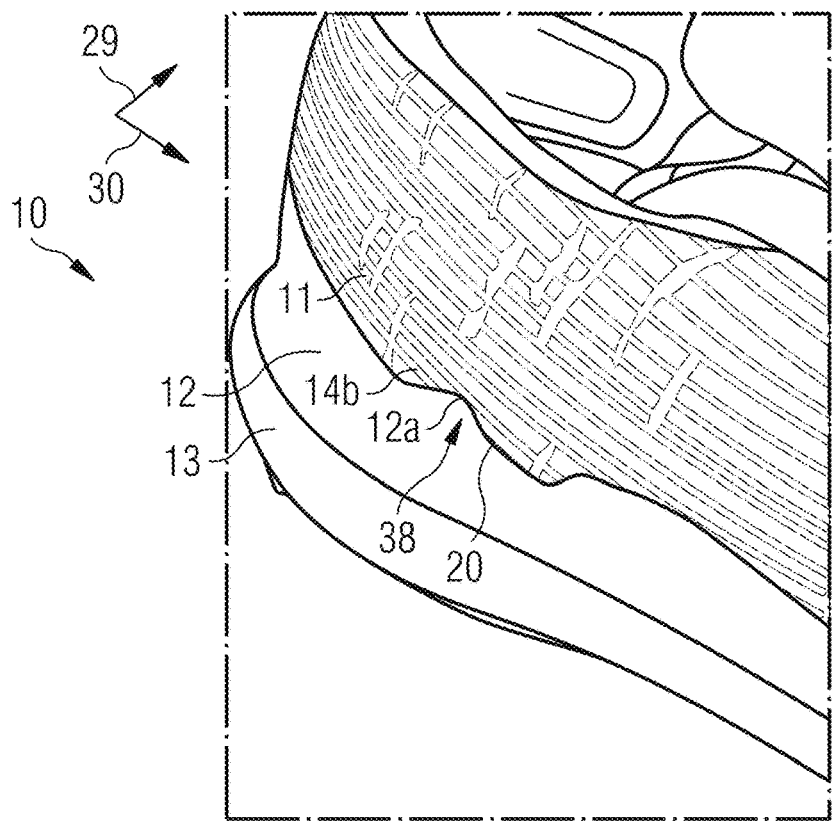
FIG. 4 shows another exemplary article of footwear according to the present invention.

FIG. 4 shows another exemplary article of footwear 10 according to the present invention. The article of footwear 10 comprises an upper 11; an injection-molded region comprising a resin, wherein the resin at least partly coats an outer surface of the upper 11, wherein the resin coating 12 ceases at a first position 20, and wherein a thickness of the resin coating 12 increases gradually, in at least a first region of the upper 11. The resin is for forming a sole element 13 and additionally acts as a coating 12 applied on the upper 11.

The exemplary upper 11 is weft knitted. A course direction 29 is arranged substantially perpendicular to a longitudinal direction of the upper 11 in a least a fifth portion 38 of the upper 11. Therefore, a wale direction 30 is arranged substantially parallel, i.e. between 0 to 30°, to a longitudinal direction of the upper 11 in a least the fifth portion 38 of the upper 11. A channel 14b is formed between adjacent wales, arranged substantially perpendicular to the course direction, in the fifth portion 38. Therefore, the pressurized molten resin cannot flow easily into the channel 14b during the injection molding, since the walls on the edges of the channel 14b may prevent flow into the channel, reducing the amount of unintended flashing further. However, as can be seen from FIG. 4, the amount of coating can still be controlled and a coating 12a may, for example, form a pocket. In this example, the fifth portion 38 is arranged in a lateral region of the upper just ahead of a heel region.

Figure 5:
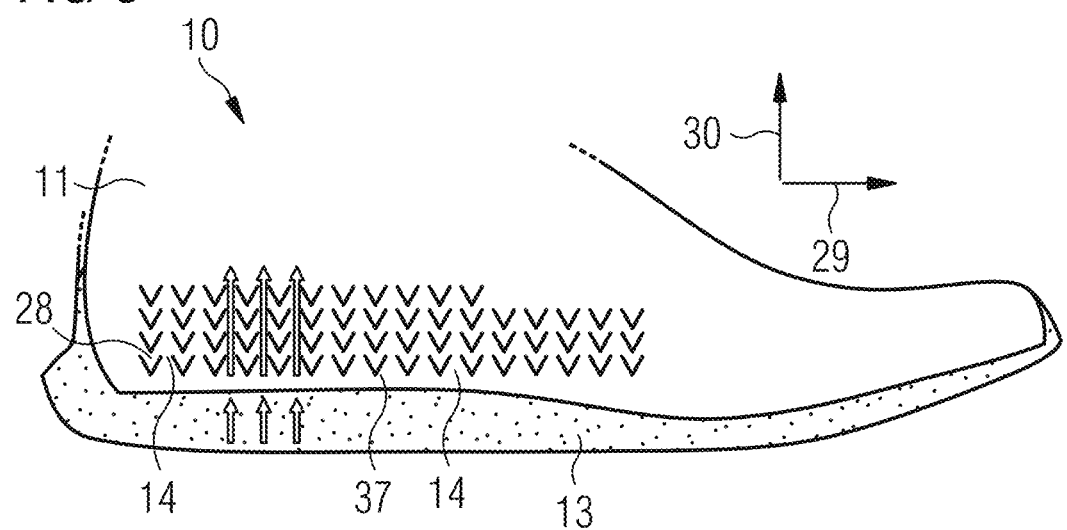
FIG. 5 shows another exemplary article of footwear according to the present invention.

FIG. 5 shows a schematic of another exemplary article of footwear 10 according to the present invention. The article of footwear 10 comprises an upper 11; an injection-molded region comprising a resin, wherein the resin at least partly coats an outer surface of the upper 11, wherein the resin coating ceases at a first position, and wherein a thickness of the resin coating increases gradually, in at least a first region of the upper 11. The resin is for forming a sole element 13 and additionally acts as a coating applied on the upper 11.

The exemplary upper 11 is weft knitted. Knitted loops are indicated with reference sign 28. A wale direction 30 is arranged substantially perpendicular to a longitudinal direction of the upper 11 in a least a fourth portion 37 of the upper 11. A channel 14 is formed between adjacent wales in the fourth portion 37. Therefore, the pressurized molten resin may flow in a controllable manner in the fourth portion 37 within the channel 14 during the injection molding. This is illustrated by the vertical arrows.

Figure 6A:
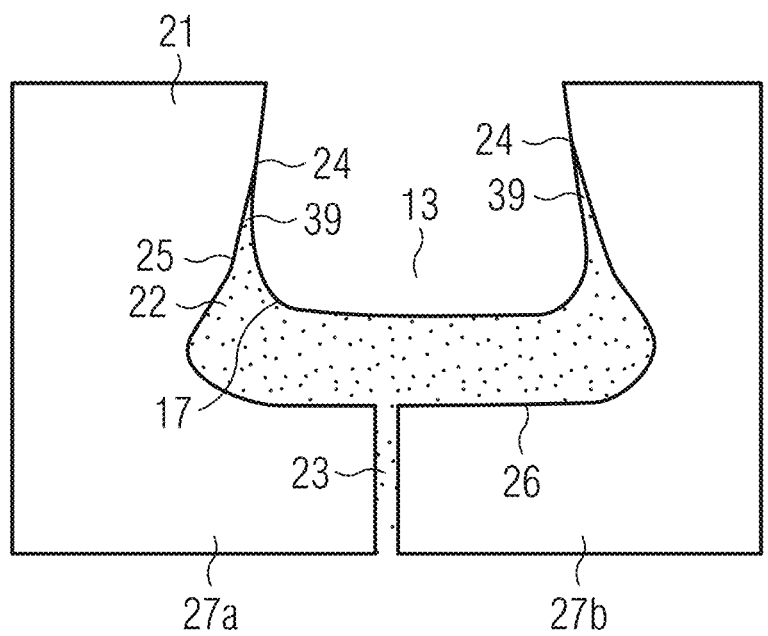

FIG. 6A shows a cross-section of a mold 21 according to the present invention comprising: a side wall 25 forming a cavity for receiving a shoe upper 11, wherein the side wall 25 is configured to contact the upper 11 at a contacting point 24 and wherein, after injecting a pressurized molten resin into the mold 21, there is a gap 22 filled with the resin between a side wall 25 of the mold 21 and an outer surface 17 of the upper 11, wherein the gap 22 is essentially zero at a contacting point 24, wherein the gap 22 increases gradually from the contacting point 24, in at least a first region 39 of the mold 21; and at least a first injection channel 23 for injecting a pressurized molten resin.

Another way of describing the shape of the mold 21 according to the present invention is to say that a bite line of the mold is not a narrow sharp line, unlike in conventional molds, but instead, the bite line is relatively flat and gradually sloping.

An upper 11 is arranged on a last (not shown separately) and placed inside the mold 21. The cavity comprises both the gap 22 and the upper 11 arranged on a last.

The gap 22 increases by less than 1 mm per mm of a distance from the contacting point 24 in at least the first region of the mold 21, wherein the distance is measured along the outer surface of the upper 11. The distance is a height determined from the contacting point 24 towards a bottom region of the upper 11.

The first region 39 of the mold 21 is arranged at least 2 cm above a floor 26 of the cavity, with respect to the orientation of the shoe upper 11.

In this example, the side wall 25 of the mold 21 has a substantially convex shape. The side wall 25 may have a texture in order to impart a texture on the resin, although in this case, the side wall 25 does not comprise a texture. The mold 21 comprises a first part 27a and a second part 27b and the first part 27a and the second part 27b are joined in a heel and a toe region.

The first injection channel 23 is arranged in a heel region of the mold 21. The first injection channel 23 is arranged underneath the upper 11, in a heel region.

The mold 21 may further comprise at least a second injection channel, although in this example, there is only a single injection channel 23.

The resin may be produced by the reaction of one or more compositions in the mold. For example, the resin may comprise a polyurethane and be produced by injecting a polyol into the mold at a temperature of about 35° C. and further injecting an isocyanate into the mold at a temperature of about 50° C. The polyol and isocyanate undergo an exothermic reaction forming polyurethane and may raise the temperature of the mold, for example to about 60° C. In this case, foaming of the polyol and the isocyanate may be the main source of pressure around the contacting point 24, where the pressure due to the injection pressure of the polyol and the isocyanate may be negligibly small.

FIG. 6B in contrast shows a cross-section of a mold 31 as known in the art. A difference between a mold 31 as known in the art and a mold 21 according to the present invention is that at a contacting point 34, the gap 22 does not increase gradually from the contacting point 34. Instead, the contacting point 34 defines a sharp boundary with the disadvantages described herein.

FIG. 6C shows how a mold 21 as shown in FIG. 6A may be opened. The mold 21 may be opened by moving the first part 27a and the second part 27b in opposite directions along a left 36a and a right 36b sideways direction. Geometrically, this arrangement is advantageous since it allows a great variety of shapes to be molded, for example so-called "undercuts" 35, which would not be possible for some alternative mold layouts, e.g. a mold where a top and a bottom portion are moved relative to each other to open the mold, as the mold will get stuck while being opened on an area of the sole element that is projecting outwards. An undercut may, for example, be part of a ground-engaging profile of a shoe and may improve the grip of a sole.

FIG. 6D illustrates an aspect of a method according to the present invention. FIG. 6D shows a cross-sectional outline of an upper, arranged on a last 43. The last 43 is in tight contact with an inner surface of the upper. According to this exemplary aspect, closing the mold causes the upper to be compressed. In other words, the mold is smaller than the lasted upper. The solid line 41 indicates an outer surface of the upper when the upper is not compressed. The dotted line 42 indicates the outer surface of the upper, when the upper is compressed by the mold, prior to injection of the resin. Therefore, the dotted line 42 indicates essentially also the side wall of the mold for this cross-sectional cut. An uncompressed thickness of the upper is the distance between the surface of the last 43, since the upper is tightly arranged on the last 43, and the outer surface 41 of the uncompressed upper. A compressed thickness of the upper is the distance between the surface of the last 43 and the outer surface 42 of the compressed upper.

The compression distance is the distance between the uncompressed outer surface and the compressed outer surface of the upper, since the inner surface of the upper is arranged tightly on an essentially incompressible last 43. The material of the upper is compressed by a first compression distance 48 in a first part 44 of the upper and a second compression distance 49 in a second part 46 of the upper, wherein the first compression distance 48 is smaller than the second compression distance 49.

The first part 44 of the upper is arranged in a toe region 44. A similar compression is effected in a heel region 45. The second part 46 of the upper is arranged in a medial region 46. The upper is compressed by a third compression distance in a lateral region 47 of the upper, wherein the third compression distance is greater than the first compression distance 48 but smaller than the second compression distance 49. In this example, the first compression distance 48 is 0.3 mm, the second compression distance 49 is 1 mm and the third compression distance is 0.5 mm.

FIG. 7A shows an exemplary shoe 50 comprising an upper 51 as known in the art. The shoe 50 further comprises a sole. The sole 53 is injection molded and displays a pinching effect 52 wherein some resin is pinched, in this example in the forefoot area, between separate parts of the mold during the molding process. The resulting pinching has an un-attractive visual appearance and presently needs to be removed manually.

FIG. 7B shows another view of the exemplary shoe 50 of FIG. 7A. The upper 51 displays a flashing effect 54, which is an undesired spillover of the resin into areas of the upper where it is not desired. During injection molding, the resin crept into parts of the upper 51 unintentionally, giving the upper a defective and unclean look.

FIG. 8 shows another exemplary article of footwear 10 according to the present invention. The article of footwear 10 comprises an upper 11, which is weft-knitted and coated by a coating 12 comprising a resin by a method according to the present invention. A plurality of channels 14 is formed in the knitted structure, of which an exemplary two channels are indicated with reference numeral 14. The channels 14 are one example of a knit-opening 61 which is at least partially filled by resin. The exemplary article of footwear 10 also comprises a sole element 13, comprising a rear part 13b and a front part 13a, wherein the front part 13a is formed by the resin, i.e. the resin comprised in the coating 12.

FIG. 9 shows another exemplary article of footwear 10 according to the present invention. The article of footwear 10 comprises an upper 11, which is also weft-knitted and coated by a coating 12 comprising a resin by a method according to the present invention. A plurality of channels 14 is formed in the knitted structure in-between strongly pronounced ribs 62. An exemplary two channels are indicated with reference numeral 14 and an exemplary two ribs are indicated with reference numeral 62. The channels 14 are one example of a knit-opening 61 which is at least partially filled by resin. FIG. 9 shows an example of how the resin may adapt to the knitted structure. Part of the ribs 63 is also coated by the resin. However, the structure of the coated ribs 63 is still visible through the coating 12. A thickness of the resin coating is sufficiently thin for the knitted structure of the ribs 63 to remain visible through the resin coating.

FIG. 10 shows another exemplary article of footwear 10 according to the present invention. The article of footwear 10 comprises an upper 11, which is weft-knitted and coated by a coating 12 comprising a resin by a method according to the present invention. A plurality of knit-openings 61 is formed in the knitted structure. The knit-openings 61 are partial holes. Some knit-openings 64 are coated by the resin. The resin thus takes a pattern of the knitted upper 11, i.e. visually replicating the texture of the knitted upper 11. The exemplary article of footwear 10 also comprises a sole element 13, comprising the resin.

FIG. 11 shows another exemplary article of footwear 10 according to the present invention. The article of footwear 10 comprises an upper 11, which is weft-knitted and coated by a coating 12 comprising a resin by a method according to the present invention. An edge 65 of the coating is essentially flush with an outer surface of the upper. The exemplary article of footwear 10 also comprises an outsole 16, which is not formed with the resin but instead attached in a separate step.

Some embodiments described herein relate to method of producing an article of footwear comprising providing an upper; providing a mold and opening the mold; inserting the upper into the open mold; closing the mold; and injecting a pressurized molten resin, wherein, after the injecting, there is a gap filled with the resin between a side wall of the mold and an outer surface of at least a first portion of the upper, wherein the gap is essentially zero at a contacting point, wherein the gap increases gradually from the contacting point in at least a first region of the mold.

In any of various embodiments described herein, the side wall of the mold has a substantially convex shape.

In any of various embodiments described herein, the material of the upper is compressed by a first compression distance in a first part of the upper and a second compression distance in a second part of the upper, wherein the first compression distance is smaller than the second compression distance, wherein the first part of the upper is arranged in a heel or a toe region and the second part of the upper is arranged in a lateral or a medial region of the upper.

In any of various embodiments described herein, the mold comprises at least a first part and a second part, and wherein the first part and the second part are joining in a heel region and a toe region.

In any of various embodiments described herein, wherein the mold further comprises at least a first injection channel for injecting the pressurized molten resin, and wherein the first injection channel is arranged in a heel region of the mold.

In any of various embodiments described herein, the mold further comprises at least a second injection channel In any of various embodiments described herein, the upper is warp-knitted or weft-knitted In any of various embodiments described herein, the method further comprises at least partially filling at least one knit-opening in the warp-knitted or weft-knitted upper with the resin.

In any of various embodiments described herein, the resin forms at least a part of a sole element of the article of footwear, wherein the sole element is a midsole of the article of footwear.

In any of various embodiments described herein, the resin forms at least a part of a sole element of the article of footwear, wherein the sole element is the entire sole of the article of footwear.

Some embodiments described herein relate to a mold for producing an article of footwear comprising a side wall forming a cavity for receiving a shoe upper, wherein the side wall is configured to contact the upper at a contacting point and wherein, after injecting a pressurized molten resin into the mold, there is a gap filled with the resin between a side wall of the mold and an outer surface of the upper, wherein the gap is essentially zero at the contacting point, wherein the gap increases gradually from the contacting point, in at least a first region of the mold; and at least a first injection channel for injecting a pressurized molten resin.

In any of various embodiments described herein, the mold further comprising at least a second injection channel.

Some embodiments described herein relate to an article of footwear comprising: an upper; an injection-molded region comprising a resin, an injection-molded region comprising a resin, wherein the resin coating ceases at a first position, and wherein a thickness of the resin coating increases gradually, in at least a first region of the upper.

In any of various embodiments described herein, the resin forms a sole element of the article of footwear.

In any of various embodiments described herein, the resin forms a sole element of the article of footwear, wherein the sole element is a midsole of the article of footwear.

In any of various embodiments described herein, the resin forms a sole element of the article of footwear, wherein the sole element is the entire sole of the article of footwear.

In any of various embodiments described herein, wherein the injection-molded region is devoid of any pinching.

REFERENCE SIGNS

10: article of footwear
11: upper
12: coating
13: sole element
14: channel
15: tongue
16: outsole
17: outer surface of the upper 18: surface of the coating
19: first region of the upper
20: first position
21: mold
22: gap
23: injection channel
24: intersection point
25: side wall
26: floor
27a: first part
27b: second part
28: loop
29: course direction
30: wale direction
31: mold as known in the art
34: intersection point for mold as known in the art
35: undercut
36: sideways direction
37: fourth portion
38: fifth portion
39: first region of the mold
40: lateral direction
41: uncompressed outer surface of upper
42: compressed outer surface of upper
43: last
44: toe region
45: heel region
46: medial region
47: lateral region
48: first compression distance
49: second compression distance
50: conventional shoe
51: conventional upper
52: pinching
53: conventional sole
54: flashing
61: knit-opening
62: rib
63: coated rib
64: coated knit-opening
65: edge

The invention claimed is:

1. A method of producing an article of footwear comprising:
providing an upper;
providing a mold and opening the mold;
inserting the upper into the open mold;
closing the mold; and
injecting a pressurized molten resin,
wherein, after the injecting, there is a gap filled with the resin between a side wall of the mold and an outer surface of at least a first portion of the upper, wherein the gap is essentially zero at a contacting point between the side wall of the mold and the outer surface of at least the first portion of the upper, wherein the gap increases gradually from the contacting point in at least a first region of the mold,
wherein the resin forms a coating along the outer surface of the first portion of the upper, and the resin forms at least a part of a sole element disposed along an outer surface of a bottom region of the upper,
wherein the first portion of the upper is disposed along a side of the upper, and the bottom region of the upper is disposed below the first portion of the upper and extends from a lateral side to a medial side of the upper, and
wherein closing the mold compresses at least a second portion of the upper, and wherein the second portion of the upper is compressed by a first compression distance at a first part of the second portion of the upper and by a second compression distance at a second part of the second portion of the upper, wherein the first compression distance is smaller than the second compression distance.

2. The method of claim 1, wherein injecting the pressurized molten resin further compresses at least a third portion of the upper such that a gap opens between an outer surface of the third portion of the upper and the side wall of the mold.

3. The method according to claim 1, wherein the gap increases by less than 1 mm per mm of a distance from the contacting point in at least the first region of the mold, wherein the distance is measured along the outer surface of the first portion of the upper.

4. The method according to claim 1, wherein the side wall contacts the outer surface of the first portion of the upper at the contacting point at an angle of less than 30 degrees.

5. The method according to claim 1, wherein the first region of the mold is arranged within 5 mm below the contacting point.

6. The method according to claim 1, wherein the upper is arranged on a shoe last, prior to inserting the upper into the open mold.

* * * * *